United States Patent
Rajwan et al.

(10) Patent No.: US 12,339,684 B2
(45) Date of Patent: *Jun. 24, 2025

(54) SYSTEM-ON-CHIP WITH POWER SUPPLY MODE HAVING REDUCED NUMBER OF PHASES

(71) Applicant: APPLE INC., Cupertino, CA (US)

(72) Inventors: Doron Rajwan, Rishon Lezion (IL); Craig S Forbell, Los Gatos, CA (US); Jamie L Langlinais, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,872

(22) Filed: May 10, 2023

(65) Prior Publication Data

US 2023/0280772 A1    Sep. 7, 2023

Related U.S. Application Data

(63) Continuation of application No. 17/572,664, filed on Jan. 11, 2022, now Pat. No. 11,709,512.
(Continued)

(51) Int. Cl.
*G05F 1/62* (2006.01)
*G05F 1/46* (2006.01)
*H02M 3/158* (2006.01)

(52) U.S. Cl.
CPC ................. *G05F 1/46* (2013.01); *G05F 1/62* (2013.01); *H02M 3/158* (2013.01)

(58) Field of Classification Search
None
See application file for complete search history.

(56) References Cited

U.S. PATENT DOCUMENTS 6,031,362 A * 2/2000 Bradley ............ H02M 3/33561
                                                                323/267
8,026,636 B2 * 9/2011 Oh ............................ G05F 1/46
                                                                307/31
(Continued)

FOREIGN PATENT DOCUMENTS

KR     1020110123698 A    11/2011
WO        2015134175 A1     9/2015
WO        2017209783 A1    12/2017

OTHER PUBLICATIONS

DE Application # 112022003384.3 Office Action dated May 2, 2024.
(Continued)

*Primary Examiner* — Thomas J. Hiltunen
(74) *Attorney, Agent, or Firm* — Meitar Patents Ltd.; Daniel Kligler (57) ABSTRACT

An apparatus includes hardware circuits, a front-end power supply, voltage regulators, and control circuitry. The front-end power supply generates electrical power for the hardware circuits. The front-end power supply includes power stages that generate portions of electrical power and are activated and deactivated independently. The voltage regulators are connected to an output of the front-end power supply and provide adjustable operating voltages to the hardware circuits. The control circuitry controls the voltage regulators to supply the adjustable operating voltages responsively to requests from the hardware circuits, compares the adjustable operating voltages to settings that are specified as safe for provisioning by a predefined partial number of the power stages of the front-end power supply, and adaptively activates and deactivates the power stages, including ensuring that a number of active power stages is set to the predefined partial number only while the operating voltages match the safe settings.

17 Claims, 6 Drawing Sheets

Related U.S. Application Data

(60) Provisional application No. 63/243,754, filed on Sep. 14, 2021.

(56) References Cited

U.S. PATENT DOCUMENTS

| | | | | |
|---|---|---|---|---|
| 8,890,362 | B2* | 11/2014 | Kawasaki | G06F 1/3287 |
| | | | | 307/82 |
| 9,088,176 | B2* | 7/2015 | Hendin | H02M 3/28 |
| 9,431,904 | B2* | 8/2016 | Dalena | H02M 3/1588 |
| 9,915,962 | B2* | 3/2018 | Lee | G05F 1/575 |
| 10,381,925 | B2* | 8/2019 | Lee | G01R 31/40 |
| 11,709,512 | B2* | 7/2023 | Rajwan | G05F 1/46 |
| | | | | 327/540 |
| 11,837,959 | B2* | 12/2023 | Tschirhart | H02M 3/1584 |
| 2008/0054862 | A1* | 3/2008 | Hara | H02M 3/157 |
| | | | | 323/234 |
| 2010/0250973 | A1* | 9/2010 | Breen, III | G06F 1/30 |
| | | | | 713/300 |
| 2012/0001601 | A1* | 1/2012 | Motoyama | H02M 3/158 |
| | | | | 323/234 |
| 2024/0063715 | A1* | 2/2024 | Uan-Zo-li | H02M 1/008 |

OTHER PUBLICATIONS

KR Application # 1020247006683 Office Action dated May 9, 2024.
CN Application # 202280059636.6 Office Action dated Nov. 23, 2024.
KR Application # 1020247006683 Office Action dated Dec. 19, 2024.

* cited by examiner

SYSTEM-ON-CHIP WITH POWER SUPPLY MODE HAVING REDUCED NUMBER OF PHASES

CROSS-REFERENCE TO RELATED APPLICATION

This application is a continuation of U.S. patent application Ser. No. 17/572,664, filed Jan. 11, 2022, which claims the benefit of U.S. Provisional Patent Application 63/243,754, filed Sep. 14, 2021. The disclosures of these related applications are incorporated herein by reference.

TECHNICAL FIELD

Embodiments described herein relate generally to power management in electronic circuitry, and particularly to adaptive activation and deactivation of power stages of a power supply.

BACKGROUND

Various power management schemes use a plurality of voltage regulators, e.g., in order to adapt efficiently to variable load conditions. For example, U.S. Patent Application Publication 2004/0061380 describes techniques for distribution and conditioning of power to one or more variable loads. Power is supplied to one or more power conversion units (PCUs) connected to the one or more variable loads. The PCUs are adapted to convert the power to other forms suitable for use by the components of the destination system. Additionally, a power control module is adapted to monitor the load requirements, both current and future, of the one or more variable loads. Based at least in part on the load requirements, the power control module controls the operation of the one or more PCUs to provide sufficient power to the one or more loads at the appropriate time while minimizing wasted power generation by deactivating any unnecessary PCUs.

As another example, U.S. Pat. No. 7,161,339 describes a voltage regulator circuit that includes a single high voltage regulator, and a plurality of parallel low voltage regulators capable of receiving an intermediate voltage from the high-voltage regulator, and capable of outputting a regulated output voltage.

U.S. Patent Application Publication 2013/0207467 describes a system that includes loads, linear regulators, switches and a controller. The linear regulators supply power to the loads, and the controller is adapted to use the switches to selectively couple power sources to the linear regulators to regulate a collective power dissipation of linear regulators.

SUMMARY OF THE DISCLOSURE

An embodiment described herein provides an apparatus including multiple hardware circuits, a front-end power supply, multiple voltage regulators, and control circuitry. The front-end power supply is configured to generate electrical power for powering the multiple hardware circuits. The front-end power supply includes a set of power stages, which are configured to generate respective portions of the electrical power and to be activated and deactivated independently of one another. The voltage regulators are connected to an output of the front-end power supply and are configured to provide adjustable operating voltages to the hardware circuits. The control circuitry is configured to control the voltage regulators to supply to the hardware circuits a setting of the adjustable operating voltages in response to requests from the hardware circuits, to compare the setting of the adjustable operating voltages to one or more safe settings that are specified as safe for provisioning by a predefined partial number of the power stages of the front-end power supply, and to adaptively activate and deactivate the power stages, including ensuring that a number of active power stages is set to the predefined partial number only while the setting of the operating voltages matches at least one of the safe settings.

In some embodiments, to adaptively activate and deactivate the power stages, the control circuitry is further configured to (i) at times in which the setting matches at least one of the safe settings, control the front-end power supply so that only the predefined partial number of the power stages are active, and (ii) at other times in which the setting does not match any the safe settings, control the front-end power supply so that more than the predefined partial number of the power stages are active.

In an embodiment, in addition to adaptively activating and deactivating the power stages, the control circuitry is configured to adaptively transition one or more of the power stages between a normal mode and a standby mode. In a disclosed embodiment, the predefined partial number of the power stages is a single power stage.

In an example embodiment, while the number of active power stages is the predefined partial number, the control circuitry is configured to (i) detect that a request from one of the hardware circuits is expected to change the setting of the operating voltages from a safe setting to an unsafe setting, and (ii) control the voltage regulators to switch to the unsafe setting only after increasing the number of active power stages.

In an embodiment, at least one of the safe settings depends on one or more specified temperature thresholds, and, in comparing the setting of the adjustable operating voltages to the safe settings, the control circuitry is configured to compare one or more temperatures associated with the apparatus to the one or more temperature thresholds.

There is additionally provided, in accordance with an embodiment described herein, a method including generating electrical power, for powering multiple hardware circuits, using a front-end power supply comprising a set of power stages, by generating respective portions of the electrical power using the power stages. Adjustable operating voltages are provided to the hardware circuits using multiple voltage regulators, which are connected to an output of the front-end power supply. The voltage regulators are controlled, in response to requests from the hardware circuits, to supply to the hardware circuits a setting of the adjustable operating voltages. The setting of the adjustable operating voltages is compared to one or more safe settings that are specified as safe for provisioning by a predefined partial number of the power stages of the front-end power supply. The power stages adaptively activated and deactivated, including ensuring that a number of active power stages is set to the predefined partial number only while the setting of the operating voltages matches at least one of the safe settings.

These and other embodiments will be more fully understood from the following detailed description of the embodiments thereof, taken together with the drawings in which:

DETAILED DESCRIPTION OF EMBODIMENTS

Overview

Embodiments that are described herein provide improved methods and apparatus for power management in electronic circuitry. The disclosed techniques can be used, for example, for supplying electrical power to a System-On-Chip (SOC) in a battery-operated computing or communication device.

In some embodiments, a SOC includes various hardware circuits, such as Central Processing Units (CPUs), Graphics Processing Units (GPUs), Apple Neural Engines (ANEs), communication fabrics and the like. At least some of the hardware circuits in the SOC are powered by a two-stage power supply having a primary stage (also referred to as "front-end stage" or "front-end power supply") and a secondary stage.

The primary stage of the power supply includes a set of parallel power stages (also referred to as "phases") that generate respective portions of the total electrical power. The outputs of the power stages are combined to produce a single voltage rail. The power stages are capable of being activated and deactivated individually, independently of one another. The secondary stage of the power supply includes multiple adjustable voltage regulators, which are fed by the single voltage rail (i.e., by the output of the front-end stage). The voltage regulators are configured to provide adjustable operating voltages to the hardware circuits. In a typical implementation, the voltage regulators are placed in close proximity to the hardware circuits they serve, in order to minimize noise and maximize voltage accuracy.

In some embodiments, the SOC further includes control circuitry that controls the power stages and the voltage regulators. In one example embodiment the control circuitry includes a power manager ("PMGR") and a front-end controller. The power manager is coupled to the hardware circuits (e.g., CPUs, GPUs, etc.) and controls both the voltage regulators and the front-end controller. The front-end controller controls the power stages of the front-end power supply in response to instructions from the PMGR. In alternative embodiments, the control circuitry may have any other suitable, centralized or distributed, configuration.

In some embodiments, the power supply supports various operational modes that are managed by the control circuitry. One of these modes is a low-power mode in which only a small, predefined number of power stages (e.g., a single stage) is kept active, to reduce leakage current and thus increase efficiency. Such a low-power mode is particularly advantageous in idle and other low-utilization scenarios of the SOC, in which the leakage current of a power stage is non-negligible. Numerical examples are given further below. The disclosed techniques enable fast and secure hardware-implemented transitioning into and out of the low-power mode.

In the context of the present disclosure and in the claims, the term "deactivation," as used in the disclosed low-power mode, refers to any suitable mechanism that reduces the leakage current of a power stage. Deactivation may involve, for example, actual shut-off of a power stage that causes the power stage to draw zero current, or some partial disabling that reduces the leakage current to some small but non-zero value. For example, a power stage can be deactivated by disabling its driver and non-essential blocks in order to reduce leakage current. Some blocks of the power stage, however, may remain powered in order to reduce the latency of re-activation. Deactivation typically involves disabling most or all active circuitry of a power stage, e.g., biasing and reference circuitry. In some embodiments, however, input power is retained. Deactivation is possibly employed in addition to various standby modes, which can be applied to a power stage.

When implementing a low-power mode that is based on deactivation of power stages, a major challenge is the relatively long wake-up time of the power stage when transitioning out of this mode. In a typical implementation, the wake-up time of a power stage is on the order of tens or hundreds of microseconds. Changes in load, on the other hand, may be considerably faster, e.g., on the order of one or a few microseconds. (In the present example a change in load is a change in the power consumption of one or more of the voltage regulators of the secondary stage, due to changes in power consumption of one or more of the hardware circuits.) Failing to meet the required wake-up time may cause severe voltage drops that could lead to performance degradation, or even resetting or failure of the SOC.

In some embodiments, the control circuitry transitions into and out of the low-power mode in accordance with a specified list of "safe settings." As noted above, the various voltage regulators in the secondary power-supply stage are controlled to adjust the operating voltages they provide in response to requests from the various hardware circuits. For example, a certain CPU may send a request to the control circuitry to increase its operating voltage due to an imminent increase in its computational activity, or to decrease its operating voltage upon entering an idle or less busy period. The control circuitry may respond to such requests by adjusting the voltage regulator that serves the CPU in question. Under certain circumstances the control circuitry may decline a request.

Thus, at any given time, the control circuitry is aware of the actual operating voltages supplied by the multiple voltage regulators of the secondary power-supply stage. The values of the multiple operating voltages supplied by the multiple voltage regulators at a given time is referred to herein as a "voltage setting," or simply "setting" for brevity. In some embodiments, the control circuitry holds a list of one or more settings that are defined as safe. In this context, a setting is considered safe if (and only if) the corresponding operating voltages can be produced while the front-end power supply operates with only the small number of power stages specified for the low-power mode being active.

For example, for a low-power mode that uses only a single active power stage, a setting is considered safe if the corresponding operating voltages of the voltage regulators can be supplied using only a single active power stage in the front-end power supply. If a certain setting requires more than a single power stage to be active, it is regarded as unsafe.

Similar safe and unsafe setting can be defined for low-power modes having other numbers of active power stages. For the sake of simplicity, the description that follows refers mainly to a "single-phase" low-power mode, in which only a single power stage is active and the others are inactive. The disclosed techniques, however, can be used to implement other low-power modes in which more than one (e.g., two) stages are operational.

In various embodiments, the control circuitry may use the list of safe settings in various ways, for transitioning safely into and out of the low-power mode. For example, in one embodiment the control circuitry continuously monitors requests for operating-voltage changes received from the hardware circuits. When operating in the low-power mode, the control circuitry may detect that a request from a hardware circuit for an increase in operating voltage will render the new setting (the plurality of operating voltages including the newly-requested voltage) unsafe. In such a case, the control circuitry may temporarily decline the request, then transition out of the low-power mode by activating additional power stages (e.g., all power stages), and only then adjust the appropriate voltage regulator to increase the operating voltage as requested. In this manner, the transition is unconditionally safe in spite of the slow response time of the power stages. In alternative embodiments, other suitable transition schemes can also be used.

In most of the embodiments described herein, the control circuitry decides on transitions into and out of the low-power mode solely based on operating voltages of hardware circuits. In practice, decisions based on operating voltages alone are safe and simple to implement, but may be sub-optimal. In other words, if additional parameters were to be available, the list of safe settings could be refined, and the low-power mode could be applied more liberally.

For example, in alternative embodiments the list of safe settings may also specify one or more temperature thresholds (e.g., regarding the temperature at or near one or more of the hardware circuits). In such embodiments, the control circuitry may obtain temperature measurements from one or more temperature sensors in the SOC, and compare the temperature measurements to the temperature thresholds. In this manner the control circuitry can decide whether a particular setting is safe or not based on temperature as well. Additionally or alternatively, when one or more of the hardware circuits adapt their clock frequencies in addition to operating voltages, clock frequency can also be used as a parameter that refines the definition of safe settings and the control circuitry's decisions.

The disclosed techniques enable implementation of highly-efficient low-power modes that involve complete shut-down of power stages, without compromising reliability. In some embodiments, the disclosed control circuitry is implemented purely in hardware, making the solution both fast and secure against hostile attacks.

The disclosed techniques are also simple to implement, since they require only coarse-grained knowledge as to the operating voltages of the hardware circuits being served. Even though operating voltage is only a rough, indirect indication ("proxy") for power consumption, the methods and systems described herein provide considerable energy saving. The disclosed techniques are particularly effective in extending battery life of computing and communication devices in low-utilization usage patterns.

System Description

Figure 1:
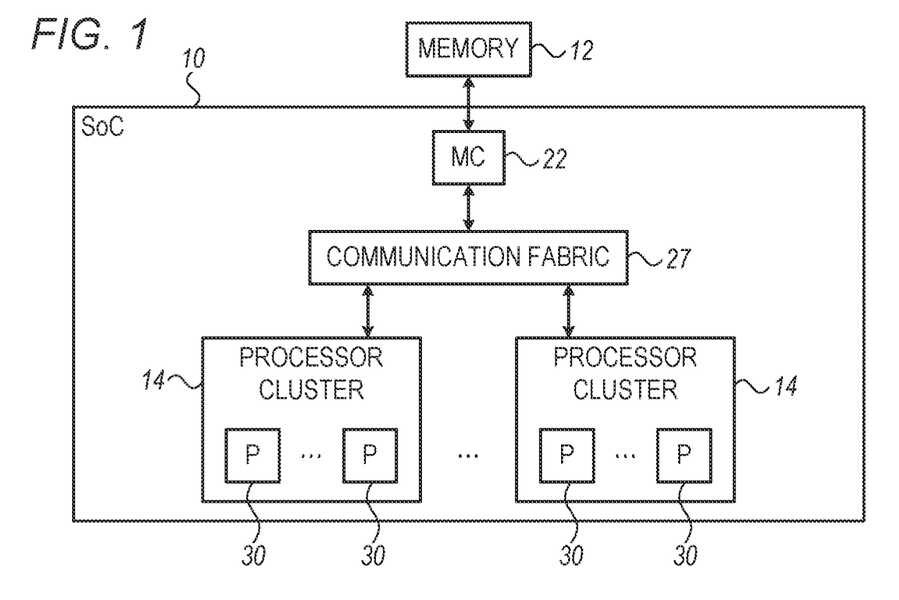
FIG. 1 is a block diagram that schematically illustrates a computing system implemented as a System-on-Chip chip (SOC), in accordance with an embodiment that is described herein.

FIG. 1 is a block diagram that schematically illustrates a computing system implemented as a System-on-Chip (SOC) 10, in accordance with an embodiment that is described herein. SOC 10 is shown coupled to a memory 12. As implied by the name, the components of SOC 10 may be integrated onto a single semiconductor substrate as an integrated circuit "chip." In some embodiments, the components may be implemented on two or more discrete chips in a system. However, SOC 10 will be used as an example herein. In the illustrated embodiment, the components of SOC 10 include a plurality of processor clusters 14, a Memory Controller (MC) 22, a communication fabric 27, and optionally one or more peripheral components (more briefly, "peripherals"—not shown in the figure). Processor clusters 14 and MC 22 may all be coupled to communication fabric 27.

Memory controller 22 may be coupled to memory 12 during use. In some embodiments, there may be more than one memory controller coupled to corresponding memory. The memory address space may be mapped across the memory controllers in any desired fashion. In the illustrated embodiment, processor clusters 14 may include respective pluralities of processors (P) 30. Processors 30 may form the central processing units (CPU(s)) of SOC 10. In an embodiment, one or more processor clusters 14 may not be used as CPUs.

As mentioned above, processor clusters 14 may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture (ISA) implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

Memory controller 22 may generally include the circuitry for receiving memory operations from the other components of SOC 10 and for accessing memory 12 to complete the memory operations. Memory controller 22 may be configured to access any type of memory 12. For example, memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). Memory controller 22 may include queues for memory operations, for ordering (and potentially reordering) the operations and presenting the operations to memory 12. Memory controller 22 may further include data buffers to store write data awaiting write to memory and read data awaiting return to the source of the memory operation. In some embodiments, memory controller 22 may include a memory cache to store recently accessed memory data. In SOC implementations, for example, the memory cache may reduce power consumption in the SOC by avoiding re-access of data from memory 12 if the data is expected to be accessed again soon. In some cases, the memory cache may also be referred to as a system cache, as opposed to private caches such as an L2 cache or caches in the processors, which serve only certain components. Additionally, in some embodiments, a system cache need not be located within memory controller 22.

Peripherals in SOC 10 may be any set of additional hardware functionality included in the SOC. For example, the peripherals may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

Communication fabric 27 may be any communication interconnect and protocol for communicating among the components of SOC 10. Communication fabric 27 may be bus-based, including shared bus configurations, cross bar configurations, and hierarchical buses with bridges. Communication fabric 27 may also be packet-based, and may be hierarchical with bridges, cross bar, point-to-point, or other interconnects.

It is noted that the number of components of SOC 10 (and the number of subcomponents for those shown in FIG. 1), such as processors 30 in each processor cluster 14, may vary from embodiment to embodiment. Additionally, the number of processors 30 in one processor cluster 14 may differ from the number of processors 30 in another processor cluster 14. There may be more or fewer of each component/subcomponent than the number shown in FIG. 1.

Safe Adaptive Activation & Deactivation of Power Stages

Figure 2:
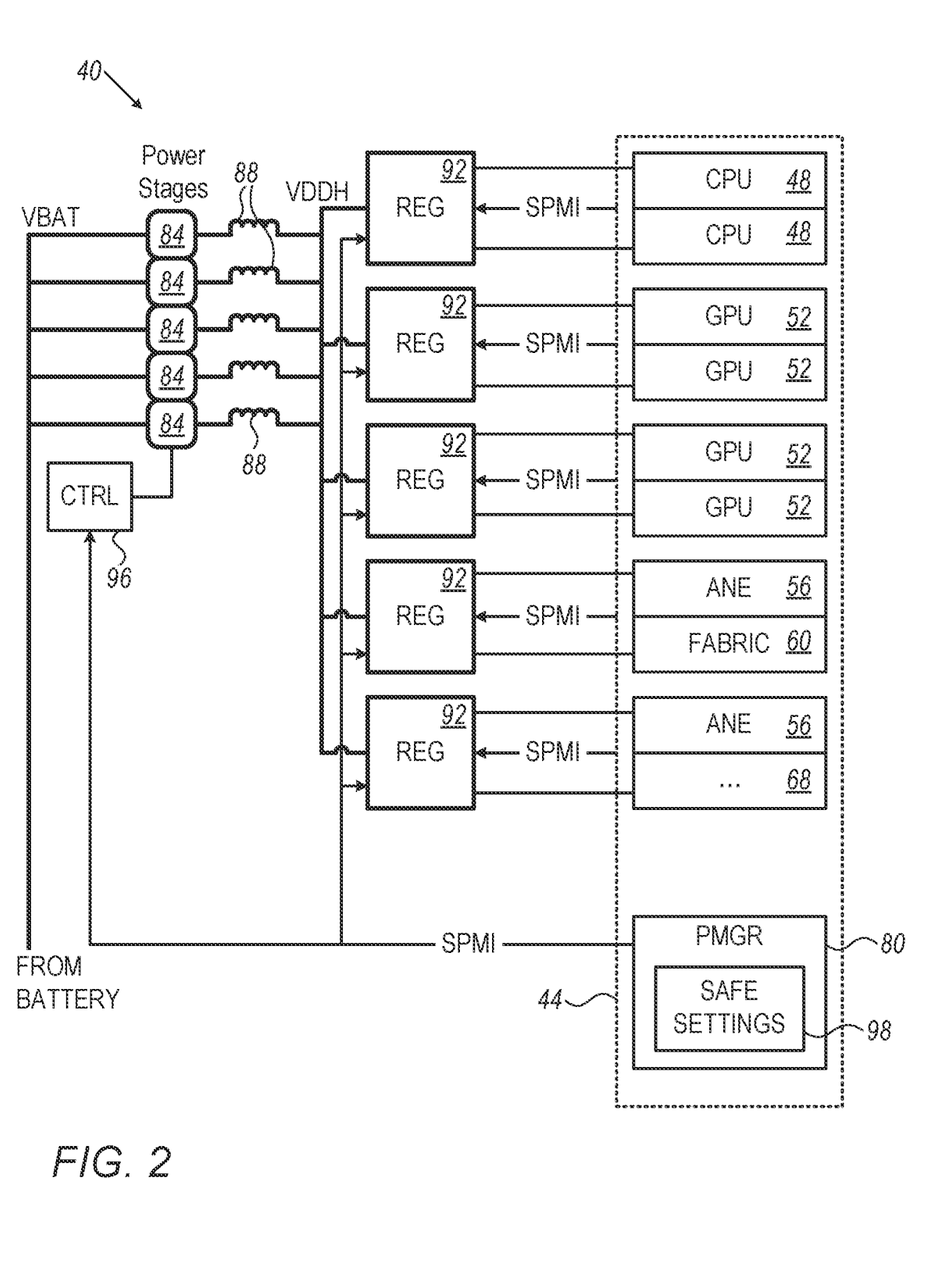
FIG. 2 is a block diagram that schematically illustrates a SOC and an associated power supply, in accordance with an embodiment that is described herein.

FIG. 2 is a block diagram that schematically illustrates a power supply 40 that supplies electrical power to a SOC 44, in accordance with an embodiment that is described herein. SOC 44 may be, for example, an example implementation of SOC 10 of FIG. 1 above. SOC 44 may be used in any suitable host system or device, such as, for example, a personal computer, a tablet or a smartphone.

SOC 44 includes a plurality of hardware circuits that are supplied with electrical power using the disclosed techniques. In the present example, the hardware circuits include two CPUs 48, four GPUs 52, two Apple Neural Engines (ANEs) 56 and a memory interconnect fabric 60. In some embodiments, an additional hardware circuit 68, or multiple additional circuits 68, may be included. Alternatively, however, the SOC may include any other suitable numbers of hardware circuits of any suitable kind. A power manager (PMGR) 80 carries out various power management tasks for SOC 44, as will be explained below.

Power supply 40 is a two-stage power supply having a primary stage (also referred to as "front-end stage" or "front-end power supply") and a secondary stage. The primary stage includes a set of parallel power stages 84 (also referred to as "phases") that generate respective portions of the total electrical power. Power stages 84 are fed by the battery voltage (denoted VBAT) of the host system. The outputs of power stages 84 are combined via respective inductors 88 to a single voltage rail denoted VDDH. A front-end controller 96 controls power stages 84, and in particular activates and deactivates the power stages as appropriate. Controller 96 is capable of activating and deactivating each power stage 84 individually, independently of other power stages. The role of controller 96 in implementing the disclosed low-power modes is explained in detail below.

In various embodiments, the battery voltage (VBAT) is compatible with any suitable battery technology, and the output voltage of the front-end stage (VDDH) is compatible with any suitable process node being used. Each power stage 84 may be capable of delivering a power level of several Watts to several tens of Watts, for example. In the example seen in FIG. 2, the number of power stages 84 is five. These values are, however, merely given as non-limiting examples. The number of power stages, and the power rating of an individual power stage, may be set to any desired values, e.g., depending on the power requirements of SOC 44. Moreover, power stages 24 need not necessarily be of the same power rating. Additionally or alternatively, one or more power stages 24 may be inside SOC 44. Generally, power stages 24 may be distributed as needed inside and/or outside the SOC.

The secondary stage of power supply 40 includes multiple adjustable voltage regulators 92, which are fed by the single voltage rail (i.e., by VDDH). Voltage regulators 92 are configured to provide adjustable operating voltages to the hardware circuits (in the present example to CPUs 48, GPUs 52, ANEs 56 and fabric 60). In the present example, each hardware circuit is served by a respective regulator 92. Each hardware circuit communicates with its respective regulator using the System Power Management Interface (SPMI) protocol. In one example embodiment, the number of regulators is five, and the voltage of each regulator 92 is adjustable in steps of 5 mV over the range of 0.4-1.2V. These values are, however, merely given as non-limiting examples. Any other configurations having any other suitable numerical values can be used in alternative embodiments. PMGR 80 in SOC 44 communicates with regulators 92 and with front-end controller 96 using any suitable protocol or protocols.

In the present context, PMGR 80 and controller 96 are referred to collectively as "control circuitry" that carries out the disclosed techniques. The description herein presents a certain task partitioning ("division of labor") between PMGR 80 and controller 96, purely by way of example. In alternative embodiments, the control circuitry may be implemented using any other suitable configuration. In alternative embodiments, any other suitable interfaces can be used among controller 96, PMGR 80, regulators 92 and the various hardware circuits. One possibility is GPIO.

In some embodiments, the control circuitry supports a low-power mode in which only a single power stage 84 is active, and the other power stages 84 are deactivated. This mode is also referred to as a "single-phase" mode. For transitioning safely into and out of the low-power mode, PMGR 80 stores a list of one or more safe settings 98. Each safe setting specifies a combination of operating voltages (supplied to the hardware circuits) that can be safely provided using only a single active power stage 84.

Table 1 below provides an example list of safe operating-voltage settings:

TABLE 1

Example safe operating-voltage settings

| Entry # | CPU max | Other CPUs | GPU max | ANE max | FAB | Other |
|---|---|---|---|---|---|---|
| 0 | v1 | v1 | v2 | v3 | v4 | . . . |
| 1 | unlimited | v5 | v2 | 0 | v4 | . . . |
| 2 | Unlimited | max | 0 | 0 | v6 | . . . |
| 3 | Unlimited | v7 | 0 | 0 | unlimited | . . . |
| . . . | | | | | | . . . |
| 7 | v8 | v3 | v9 | 0 | v4 | . . . |

In the present example, the list includes eight entries (rows). Each entry specifies a respective safe setting of the operating voltages of the hardware circuits. The "CPU max" column specifies the operating voltage of the CPU 48 that receives the highest voltage among CPUs 48. The "Other CPUs" column specifies the operating voltage of the CPU 48 that receives the second-highest voltage among CPUs 48 (i.e., the maximal voltage across all CPUs other than the CPU appearing on the "max CPU" column). The "GPU max" column specifies the operating voltage of the GPU 52 that receives the highest voltage among GPUs 52. The "ANE max" column specifies the operating voltage of the ANE 56 that receives the highest voltage among ANEs 56. The "FAB" column specifies the operating voltage of fabric 60. The "Other" column specifies the operating voltage of an additional circuit 68.

A certain setting is regarded as "matching an entry" or "matching one of the safe settings" if every operating voltage in the setting is equal to or smaller than the corresponding operating voltage specified in the entry. A certain setting is regarded as safe if it matches at least one entry. Thus, by comparing a certain setting of operating voltages to the list of safe settings, PMGR 80 is able to decide whether the setting is safe for provisioning using the low-power mode or not.

It is noted that, in some embodiments, SOC 44 includes hardware circuits that do not take part in the disclosed techniques. Such hardware circuits may include, for example, hardware circuits that are fed by fixed voltages.

Figure 3:
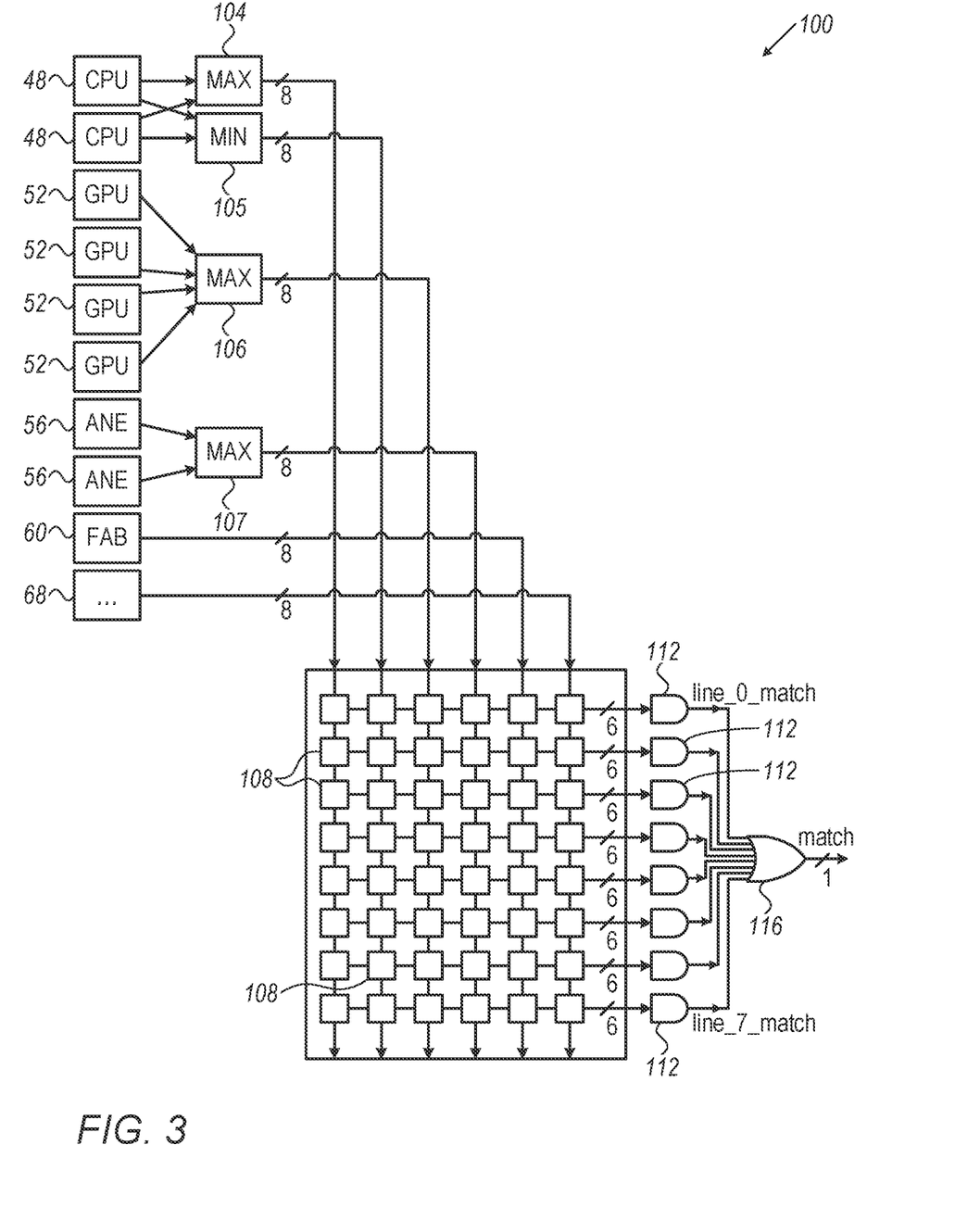
FIG. 3 is a block diagram that schematically illustrates circuitry for querying a list of safe operating-voltage settings, in accordance with an embodiment that is described herein.

FIG. 3 is a block diagram that schematically illustrates example circuitry 100 for querying the list of safe settings 98, in accordance with an embodiment that is described herein. Circuitry 100 may be, for example, part of PMGR 80 in SOC 44.

The top-left of the figure illustrates the operating voltages supplied to the various hardware circuits that participate in the operating-voltage settings, in the present example CPUs 48, GPUs 52, ANEs 56, fabric 60 and additional circuit 68. The circuitry at the top-left of the figure includes the following:

A MAX block 104 outputs the maximum among the operating voltages of CPUs 48. This value will be compared against the "CPU max" column of list 98.

A MIN block 105 outputs the minimum among the operating voltages of CPUs 48. This value will be compared against the "CPU 2nd" column of list 98.

A MAX block 106 outputs the maximum among the operating voltages of GPUs 52. This value will be compared against the "GPU max" column of list 98.

A MAX block 107 outputs the maximum among the operating voltages of ANEs 52. This value will be compared against the "ANE max" column of list 98.

The operating voltages of fabric 60 and additional circuit 68 are provided, as well, for comparison against the "FAB" and "Other" columns of list 98, respectively.

In the present example, each of the six values above is represented using eight bits. The six values are processed by an array of comparators 108. Each row in the array corresponds to a respective row (entry) of the list of safe settings 98.

In a given row, the left-most comparator 108 compares the value received from the output of MAX block 104 to the "CPU max" value of the respective entry. The next comparator 108 compares the value received from the output of MIN block 105 to the "CPU 2nd" value of the respective entry. The next comparator 108 compares the value received from the output of MAX block 106 to the "GPU max" value of the respective entry. The next comparator 108 compares the value received from the output of MAX block 107 to the "ANE max" value of the respective entry. The last two (right-most) comparators 108 compare the operating voltages of fabric 60 and additional circuit 68 to the "FAB" and "Other" values of the respective entry, respectively.

Thus, a given row of comparators outputs a total of six bits. Each row of comparators is associated with a respective AND gate 112, which outputs the logical AND of the six bits. A logical "1" at the output of a given AND gate 112 indicates that the setting being evaluated matches the respective entry (row) of list 98, and vice versa. An OR gate 116 outputs the logical OR of the outputs of AND gates 112. Therefore, a logical "1" at the output of OR gate 116 indicates that the setting being evaluated matches at least one entry of list 98. In other words, a logical "1" at the output of OR gate 116 indicates that the setting being evaluated is safe.

In some embodiments, PMGR 80 uses circuitry 100 to evaluate whether various operating-voltage settings are safe or unsafe for provisioning using the single-phase low-power mode. In alternative embodiments, PMGR 80 may use any other suitable circuitry for this purpose. In one embodiment, PMGR re-evaluates the match in response to every request from a hardware circuit to adjust its operating voltage. In an alternative embodiment, PMGR re-evaluates the match only in response to requests to increase the operating voltage.

Figure 4:
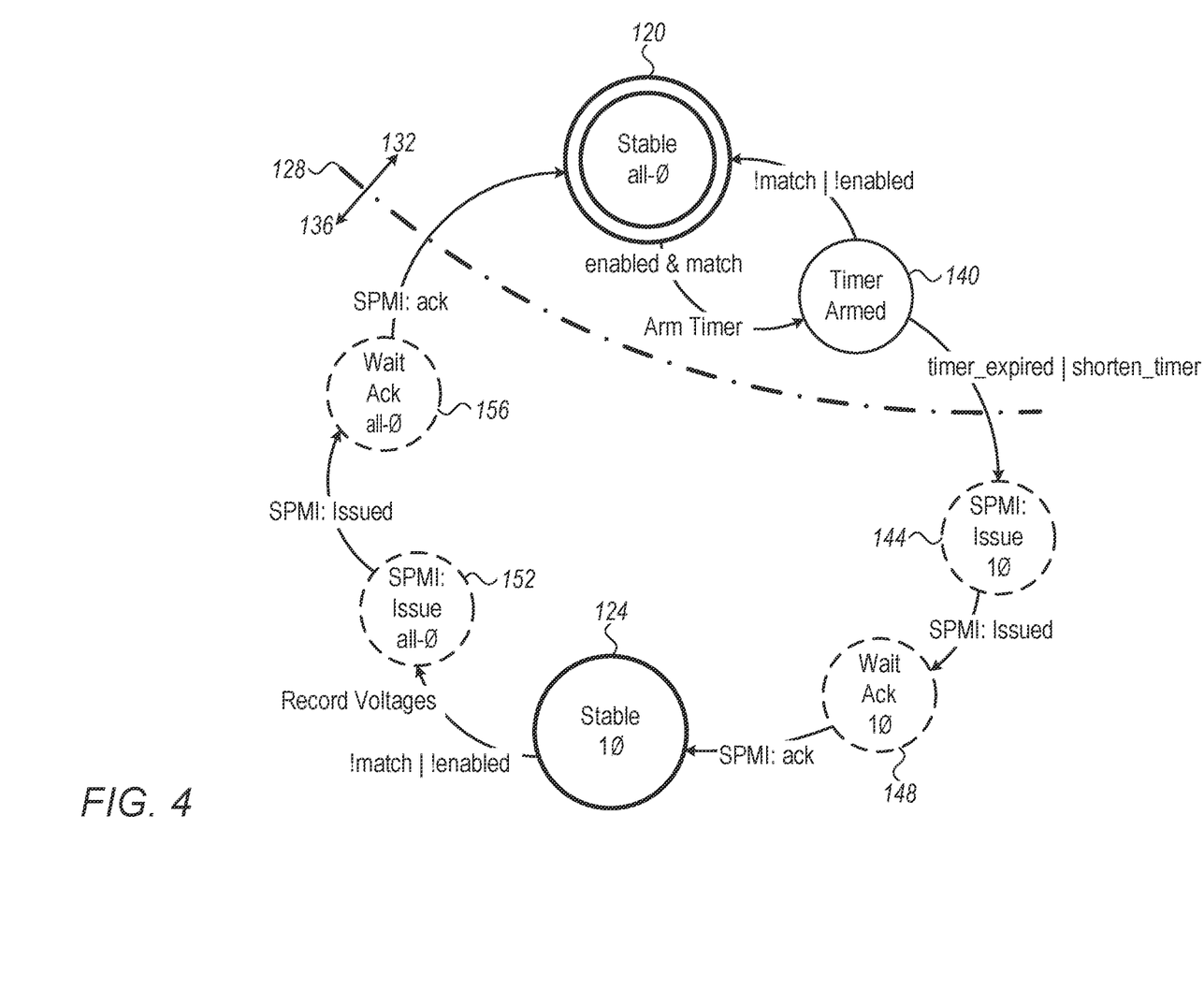
FIG. 4 is a diagram that schematically illustrates a state machine for transitioning between a low-power (single-phase) mode and a normal (all-phases) mode, in accordance with an embodiment that is described herein.

FIG. 4 is a diagram that schematically illustrates a Finite State Machine (FSM) for transitioning between a low-power (single-phase) mode and a normal (all-phases) mode, in accordance with an embodiment that is described herein. In some embodiments, a FSM of this sort is executed by the control circuitry. In the present example the FSM is executed by PMGR 80 and used, inter alia, to instruct controller 96 whether to activate all power stages 84 or only a single power stage.

The FSM of FIG. 4 receives two signal inputs:

A register bit denoted "enabled", which is set when the FSM is to be operational.

The "match" signal produced by circuitry 100 of FIG. 3, which indicates whether the match criterion is met (i.e., whether the present setting of operating voltages is safe for provisioning using only a single power stage).

In the present example, the FSM includes a total of seven states. Two main, stable states are an "all-phases" ("all-φ") state 120 in which controller 96 maintains all power stages 84 active, and a "single-phase" ("1 φ") state 124 in which controller 96 maintains only a single power stage 84 active.

When the FSM is in all-phases state 120, and the match criteria is met, PMGR 80 arms a configurable timer (e.g., a timer of about 1 msec), and transitions the FSM to a "timer armed" state 140. The timer continues counting even if new voltage-change requests arrive from hardware circuits, as long as the match criteria is met. In this state, all voltage-change requests are approved, and PMGR 80 adjusts regulators 92 (FIG. 2) accordingly.

If a new voltage-change request, from one of the hardware circuits, de-asserts the match signal, the PMGR stops the timer, and the FSM returns to all-phases state 120. When the timer expires, PMGR 80 begins a controlled process of transitioning controller 96 (and the power supply in general) to the low-power mode, i.e., to single-phase state 124. (In some embodiments, external software has the capability of shortening the timer count, so as to force an immediate transition from state 140 to state 144.)

Following expiry (or shortening) of the timer, in a single-phase command-issue state 144, the PMGR sends an SPMI command to controller 96, instructing controller 96 to deactivate all but one power stage 84. The FSM transitions to a single-phase wait-ack state 148, in which the PMGR waits for controller 96 to acknowledge the deactivation. Upon receiving an SPMI acknowledgement, PMGR 80 transitions the FSM to single-phase state 124.

The FSM exits single-phase state 124 either when the match signal is de-asserted (i.e., when the present setting of operating voltages becomes unsafe for the single-phase mode), or when the FSM is disabled.

Upon exiting single-phase state 124, PMGR 80 begins a controlled process of transitioning controller 96 (and the power supply as a whole) to all-phases state 120. In an all-phases command-issue state 152, the PMGR sends an SPMI command to controller 96, instructing controller 96 to activate all power stages 84. The FSM transitions to an all-phases wait-ack state 156, in which the PMGR waits for controller 96 to acknowledge the activation. Upon receiving an SPMI acknowledgement, PMGR 80 transitions the FSM to all-phases state 120.

In some embodiments, as a security measure, setting of the "enable" bit by external software is reflected to the hardware only in all-phases state 120 and remains stable. This mechanism guarantees that whenever the software disables the FSM, the disable indication will remain valid until the FSM returns to all-phases state 120, even if the software re-enables the FSM at some stage after disabling, during FSM transition.

As seen in FIG. 4, a line 128 divides the state space into two regions, denoted a non-monitoring region 132 and a monitoring region 136. In some embodiments, when the FSM is in monitoring region 136, PMGR 80 monitors new voltage-change requests from hardware circuits, and blocks a voltage-change request if the request causes the new setting to be unsafe. The PMGR serves the request (i.e., adjusts the appropriate regulator or regulators 92) only after the FSM has successfully crossed line 128 (i.e., transitioned to all-phases state 120). When the FSM is in non-monitoring region 132, PMGR 80 refrains from monitoring and blocking new voltage-change requests, regardless of whether the match criterion is met or not. This mechanism eliminates unnecessary latency in responding to voltage-change requests while in the all-phases mode.

ADDITIONAL EMBODIMENTS AND VARIATIONS

In an alternative embodiment, instead of using a list of safe settings 98, a simpler mechanism is to define a one-bit "safe/unsafe" indication for each hardware circuit. For example, the control circuitry may receive or generate a "safe/unsafe" bit for each hardware circuit, e.g., depending on the present voltage and/or clock frequency of that circuit. If all "safe/unsafe" bits indicate "safe" then the control circuitry applies the low-power mode. If one or more "safe/unsafe" bits indicate "unsafe", the control circuitry reverts to the normal (all-phases) mode.

Yet another possibility is to decide and switch between the low-power (single-phase) mode and the normal (all-phases) mode based on temperature alone, regardless of operating voltages.

Although the embodiments described herein mainly address deactivation of power stages in a front-end power supply of a SOC, the methods and systems described herein can also be used in any other system or application that uses a plurality of power stages.

Figure 5:
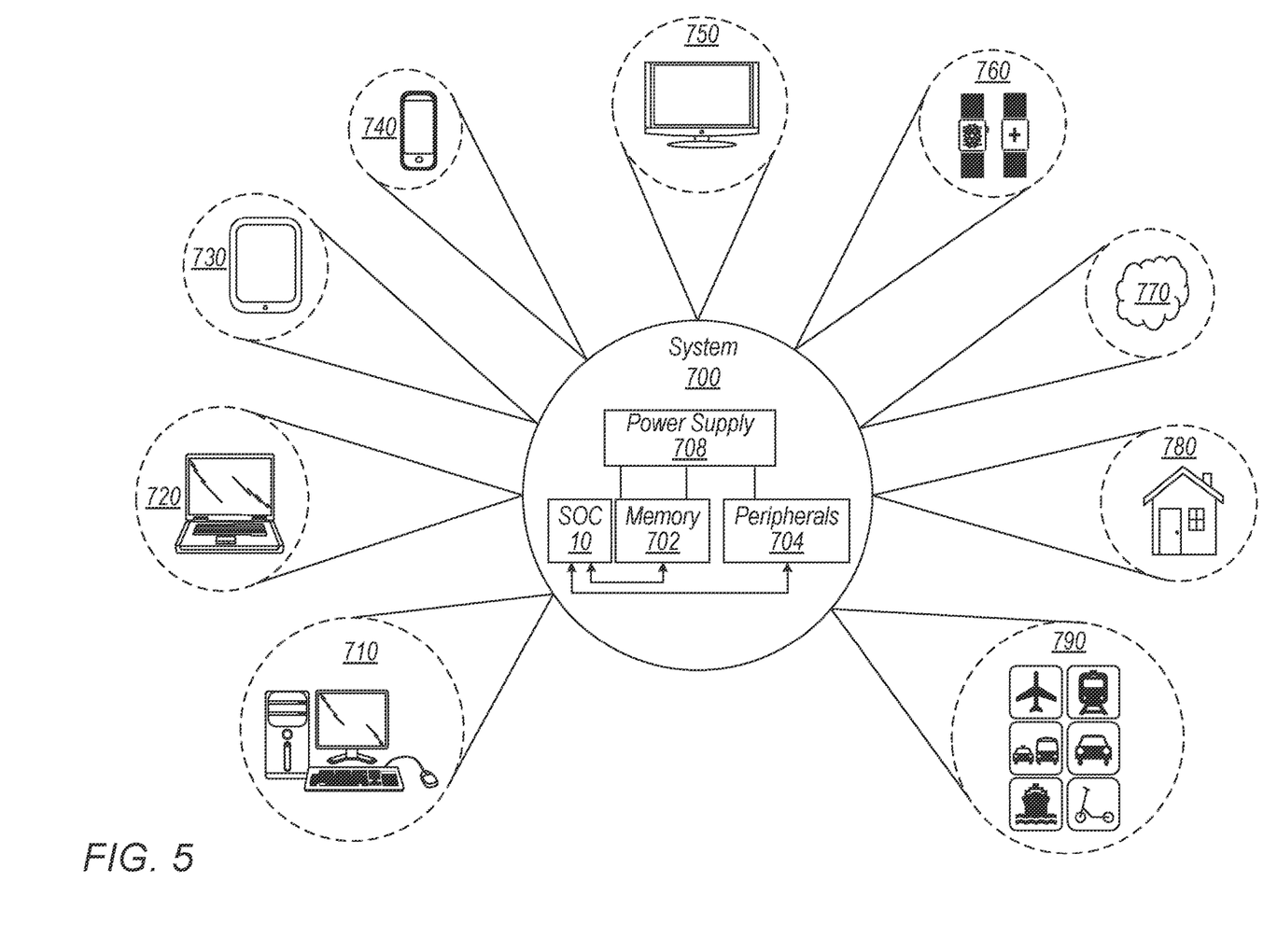
FIG. 5 is a block diagram that schematically illustrates a system, in accordance with an embodiment that is described herein.

FIG. 5 is a block diagram that schematically illustrates a system 700, in accordance with an embodiment that is described herein. In the illustrated embodiment, the system 700 includes at least one instance of a system on a chip (SOC) 10 coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 10 (e.g., the SOCs 10A-10q) may be included (and more than one memory 702 may be included as well).

The peripherals 704 may include any desired circuitry, depending on the type of system 700. For example, in one embodiment, the system 700 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 5 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 5 are illustrative only and are not intended to be limiting. Other devices are possible and are contemplated.

Figure 6:
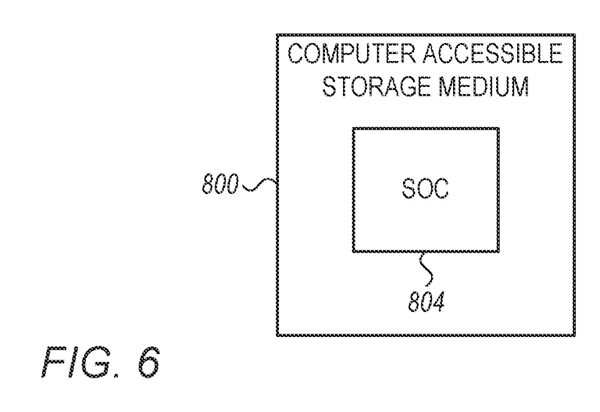
FIG. 6 is a block diagram that schematically illustrates a computer-readable storage medium, in accordance with an embodiment that is described herein.

FIG. 6 is a block diagram that schematically illustrates a computer-readable storage medium 800, in accordance with an embodiment that is described herein. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 6 may store a database 804 representative of the SOC 10. Generally, the database 804 may be a database which can be read by a program and used, directly or indirectly, to fabricate the hardware including the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates which also represent the functionality of the hardware including the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 2, for example. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus comprising two or more chips, the two or more chips comprising:
   multiple hardware circuits;
   a front-end power supply configured to generate electrical power for powering the multiple hardware circuits, the front-end power supply comprising a set of power stages, the power stages configured to generate respective portions of the electrical power and to be activated and deactivated independently of one another;

multiple voltage regulators, which are connected to an output of the front-end power supply and are configured to provide adjustable operating voltages to the hardware circuits; and control circuitry, configured to:
control the voltage regulators, in response to requests from the hardware circuits, to supply to the hardware circuits a setting of the adjustable operating voltages;
compare the setting of the adjustable operating voltages to one or more safe settings, wherein a given safe setting specifies a combination of voltage values of the adjustable operating voltages that are capable of being produced by the front-end power supply while a number of active power stages in the front-end power supply is a predefined partial number; and
adaptively activate and deactivate the power stages, including ensuring that the number of active power stages is set to the predefined partial number only while the setting of the operating voltages matches at least one of the safe settings.

2. The apparatus according to claim 1, wherein to adaptively activate and deactivate the power stages, the control circuitry is further configured to:
at times in which the setting matches at least one of the safe settings, control the front-end power supply so that only the predefined partial number of the power stages are active; and
at other times in which the setting does not match any the safe settings, control the front-end power supply so that more than the predefined partial number of the power stages are active.

3. The apparatus according to claim 1, wherein, in addition to adaptively activating and deactivating the power stages, the control circuitry is configured to adaptively transition one or more of the power stages between a normal mode and a standby mode.

4. The apparatus according to claim 1, wherein the predefined partial number of the power stages is a single power stage.

5. The apparatus according to claim 1, wherein, while the number of active power stages is the predefined partial number, the control circuitry is configured to:
detect that a request from one of the hardware circuits is expected to change the setting of the operating voltages from a safe setting to an unsafe setting; and
control the voltage regulators to switch to the unsafe setting only after increasing the number of active power stages.

6. The apparatus according to claim 1, wherein at least one of the safe settings depends on one or more specified temperature thresholds, and wherein, in comparing the setting of the adjustable operating voltages to the safe settings, the control circuitry is configured to compare one or more temperatures associated with the apparatus to the one or more temperature thresholds.

7. A method, comprising:
in a system comprising two or more chips, the two or more chips comprising multiple hardware circuits, a front-end power supply comprising a set of power stages and multiple voltage regulators, generating electrical power, for powering the multiple hardware circuits, using the front-end power supply, by generating respective portions of the electrical power using the power stages;
providing adjustable operating voltages to the hardware circuits using the multiple voltage regulators, which are connected to an output of the front-end power supply;
controlling the voltage regulators, in response to requests from the hardware circuits, to supply to the hardware circuits a setting of the adjustable operating voltages;
comparing the setting of the adjustable operating voltages to one or more safe settings, wherein a given safe setting specifies a combination of voltage values of the adjustable operating voltages that are capable of being produced by the front-end power supply while a number of active power stages in the front-end power supply is a predefined partial number; and
adaptively activating and deactivating the power stages, including ensuring that the number of active power stages is set to the predefined partial number only while the setting of the operating voltages matches at least one of the safe settings.

8. The method according to claim 7, wherein adaptively activating and deactivating the power stages comprises:
at times in which the setting matches at least one of the safe settings, controlling the front-end power supply so that only the predefined partial number of the power stages are active; and
at other times in which the setting does not match any the safe settings, controlling the front-end power supply so that more than the predefined partial number of the power stages are active.

9. The method according to claim 7, and comprising, in addition to adaptively activating and deactivating the power stages, adaptively transitioning one or more of the power stages between a normal mode and a standby mode.

10. The method according to claim 7, wherein the predefined partial number of the power stages is a single power stage.

11. The method according to claim 7, and comprising, while the number of active power stages is the predefined partial number:
detecting that a request from one of the hardware circuits is expected to change the setting of the operating voltages from a safe setting to an unsafe setting; and
controlling the voltage regulators to switch to the unsafe setting only after increasing the number of active power stages.

12. The method according to claim 7, wherein at least one of the safe settings depends on one or more specified temperature thresholds, and wherein comparing the setting of the adjustable operating voltages to the safe settings comprises comparing one or more temperatures associated with the apparatus to the one or more temperature thresholds.

13. An apparatus, comprising:
a power supply comprising a set of power stages that are configured to generate respective portions of electrical power and to be activated and deactivated independently of one another, the power supply configured to provide, from the electrical power generated by the power stages, adjustable operating voltages to a plurality of hardware circuits; and
control circuitry, configured to:
control the power supply to supply to the hardware circuits a setting of the adjustable operating voltages;
compare the setting of the adjustable operating voltages to one or more safe settings, wherein a given safe setting specifies a combination of voltage values of the adjustable operating voltages that are capable of being produced by the power supply while a number of active power stages in the power supply is a predefined partial number; and adaptively activate and deactivate the power stages so as to ensure that the number of active power stages is set to the predefined partial number only while the setting of the operating voltages matches at least one of the safe settings, including, while the number of active power stages is the predefined partial number:
  detecting request from one of the hardware circuits is expected to change the setting of the operating voltages from a safe setting to an unsafe setting; and
  controlling the power supply to switch to the unsafe setting only after increasing the number of active power stages.

14. The apparatus according to claim 13, wherein to adaptively activate and deactivate the power stages, the control circuitry is further configured to:
  at times in which the setting matches at least one of the safe settings, control the power supply so that only the predefined partial number of the power stages are active; and
  at other times in which the setting does not match any the safe settings, control the power supply so that more than the predefined partial number of the power stages are active.

15. The apparatus according to claim 13, wherein, in addition to adaptively activating and deactivating the power stages, the control circuitry is configured to adaptively transition one or more of the power stages between a normal mode and a standby mode.

16. The apparatus according to claim 13, wherein the predefined partial number of the power stages is a single power stage.

17. The apparatus according to claim 13, wherein at least one of the safe settings depends on one or more specified temperature thresholds, and wherein, in comparing the setting of the adjustable operating voltages to the safe settings, the control circuitry is configured to compare one or more temperatures associated with the apparatus to the one or more temperature thresholds.

* * * * *